Figure 1:
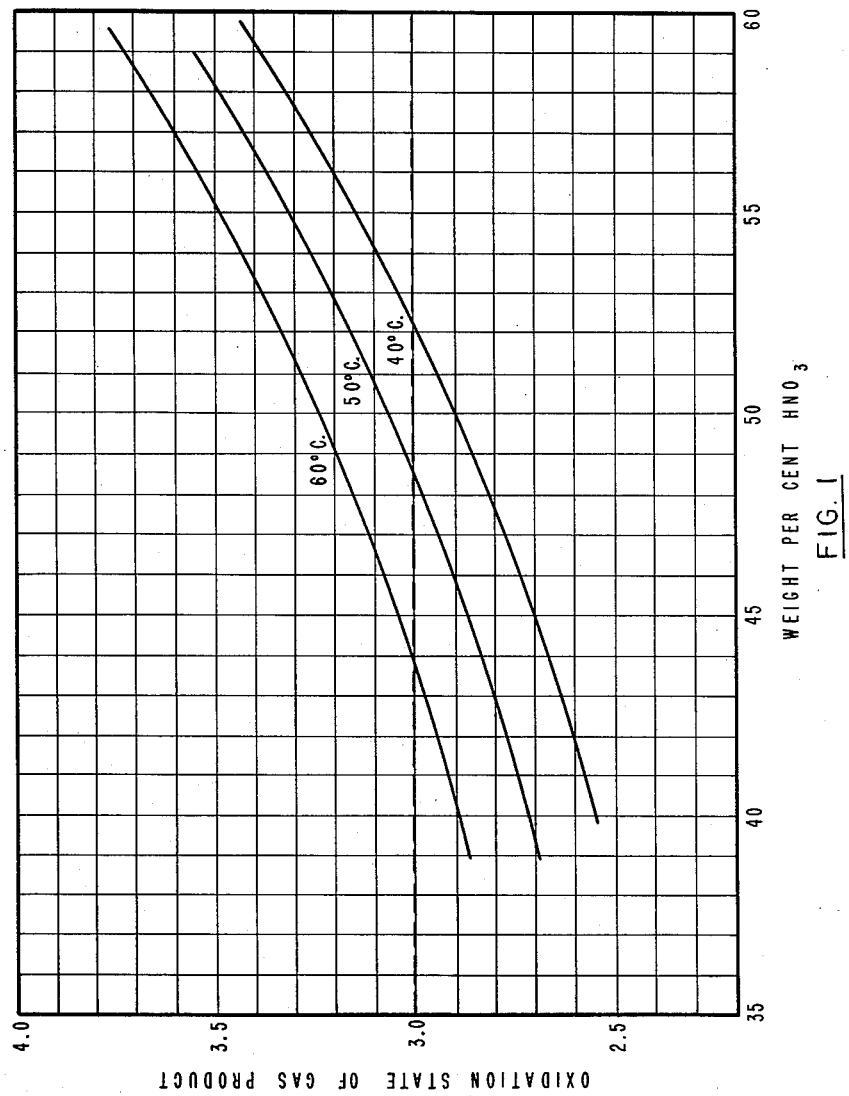

Nov. 6, 1962  D. R. LEVERING ET AL  3,062,887
PREPARATION OF NITROSAMINES
Filed July 20, 1956  3 Sheets-Sheet 1

DEWEY R. LEVERING
LUCIEN G. MAURY
   INVENTORS

BY  Ernest G. Peterson
         AGENT.

DEWEY R. LEVERING
LUCIEN G. MAURY
INVENTORS

BY Ernest G. Peterson

AGENT.

3,062,887
PREPARATION OF NITROSAMINES

Dewey Robert Levering, Wilmington, and Lucien G. Maury, Newark, Del., assignors to Hercules Powder Company, Wilmington, Del., a corporation of Delaware
Filed July 20, 1956, Ser. No. 599,173
6 Claims. (Cl. 260—583)

This invention relates to the preparation of nitrosamines. In one aspect this invention relates to the preparation of nitrosamines by reacting a secondary amine with liquid nitrogen trioxide. In one aspect this invention relates to the nitrosation of secondary amines employing as a nitrosation agent a liquefied gas product of reaction of nitric acid with at least one of the group of nitric oxide, nitrogen dioxide, nitrogen trioxide, nitrogen tetroxide, nitrogen pentoxide and nitrous acid. In still another aspect this invention relates to specific modus operandi for carrying out amine nitrosation employing nitrogen trioxide as the nitrosation agent.

It has been the practice in the art to prepare nitrosamines by reaction of the amine with nitrous acid. The reaction requires that a nitrite salt be reacted with the amine in the presence of a mineral acid usually in a dilute aqueous solution. In the case of amines or their salts which are not soluble in water, an organic solvent must be added and the reaction carried out in a two-phase system. Consonant with this procedure a slow reaction rate is obtained with associated operating problems.

This invention is concerned with a process for the rapid preparation of nitrosamines in high yields and at high conversions employing a readily available and inexpensive material as nitrosating agent.

A method for the preparation of secondary nitrosamines employing nitric oxide as the nitrosating agent is disclosed and claimed in the copending application of D. R. Levering and L. G. Maury, Serial No. 467,227, filed November 5, 1954. A method for the preparation of nitrogen trioxide-rich product suitable as nitrosating agent in the nitrosation of amines is disclosed and claimed in the copending application, Serial No. 599,174 of the same inventors, filed July 20, 1956, now Patent No. 2,935,480.

An object of this invention is to provide a process for the nitrosation of secondary amines. Another object is to provide for the utilization of nitrogen trioxide as a secondary amine nitrosating agent. Another object is to provide for nitrosation of secondary amines employing a liquefied gas product of reaction of aqueous nitric acid with at least one of the group of nitric oxide, nitrogen dioxide, nitrogen trioxide, nitrogen tetroxide, nitrogen pentoxide and nitrous acid. Another object is to provide modus operandi, inclusive of continuous flow operation, for effecting nitrosation of secondary amines. Other aspects and objects will be apparent in light of the accompanying disclosure and the appended claims.

In accordance with this invention a process is provided comprising reacting a secondary amine with liquid nitrogen trioxide, as a nitrosation agent therefor, to form a nitrosamine. Further in accordance with this invention, a secondary amine is nitrosated to form a corresponding nitrosamine employing as nitrosation agent a condensed gas product of reaction of nitric acid with at least one of the group of nitric oxide, nitrogen dioxide, nitrogen trioxide, nitrogen tetroxide, nitrogen pentoxide and nitrous acid under correlated conditions of temperature, pressure and acid concentration to form a gas product of average state of oxidation of about 2.5 to 3.2, preferably about 3.

Our invention is illustrated with reference to the following examples:

EXAMPLE 1

A 500 ml. stainless steel autoclave was cooled to below 0° C. and charged with 165 g. of nitrogen trioxide which was maintained in the autoclave in liquid state. 101 grams of dimethylamine was pumped into the liquid nitrogen trioxide in the autoclave over a period of 2.4 hours. The temperature was slowly raised from 0 to 25° C. during which time the pressure fell from a maximum of 300 p.s.i. to 66 p.s.i. The reaction was continued for an additional two hours after which the product was removed. Dimethylnitrosamine of high purity was obtained by distillation. A total of 2.24 moles of dimethylnitrosamine product was recovered, corresponding to a 100 percent conversion and yield in terms of both nitrogen trioxide and dimethylamine. The dimethylamine-nitrogen trioxide reaction was in liquid phase.

EXAMPLE 2

A 500 ml. stainless steel autoclave was cooled and charged with 82.6 g. of nitrogen trioxide dissolved in 101 g. of dimethylnitrosamine as solvent. Dimethylamine (100 g.) was pumped into the nitrogen oxide solution over a period of 1.5 hours while the temperature was maintained at 30–45° C. at a pressure of about 100 p.s.i.g. The reaction was continued for another four hours and the product was then removed and analyzed. The yield of dimethylnitrosamine was 95% based on the amine charged. The dimethylamine-nitrogen trioxide reaction was in liquid phase.

EXAMPLE 3

A 500 ml. stainless steel autoclave was charged with 41 g. of nitrogen trioxide which was maintained in the autoclave in liquid state. Diamylamine (190 g.) was pumped into the liquid nitrogen trioxide slowly over a period of 0.6 hour. The temperature was raised from 22 to 50° C. during the addition, at a maximum pressure of about 160 p.s.i., and was maintained at that pressure level at 50° C. for an additional hour. The product, n-diamylnitrosamine, was purified by distillation. The yield of n-diamylnitrosamine was 100 percent based on the amine charged. The diamylamine-nitrogen trioxide reaction was in liquid phase.

EXAMPLE 4

A 500 ml. stainless steel autoclave was charged with 100 g. of diphenylamine. A solution of 36 g. of nitrogen trioxide in 100 ml. of toluene was added slowly to the autoclave containing the diphenylamine over a period of one hour. The temperature was then raised from 16 to 65° C. at a maximum pressure of about 230 p.s.i.g. and the reaction was continued for another three hours. The solvent was stripped from the resulting product and a yellow solid remained. Purified diphenylnitrosamine product was obtained by recrystallization of the yellow solid from 95 percent ethanol. The yield was 93 percent based on the amine charged. The diphenylamine-nitrogen trioxide reaction was in liquid phase.

EXAMPLE 5

A 500 ml. stainless steel autoclave was charged with 100 grams of dimethylamine. The autoclave was cooled to 0° C. and 152 g. of liquid nitrogen trioxide was added over a period of five hours. The nitrogen trioxide was vaporized immediately upon entry in the autoclave and was then reacted with the amine, both reactants being in vapor phase. The pressure ranged from 15 to 75 p.s.i. and the temperature increased to 17° C. After a total of six hours, the product was removed and analyzed for dimethylnitrosamine. The yield was 58.5%, based on the amine charged.

EXAMPLE 6

A 500 ml. stainless steel autoclave was cooled to 0° C. and charged with 84 g. of nitrogen trioxide, maintained therein in liquid phase. Methylaniline (250 g.) was added slowly over a period of one hour. The temperature increased from 16 to 32° C. at a maximum pressure of about 100 p.s.i. Reaction was continued for an additional two hours, after which the product was removed. The product (330 g.) was distilled to recover methylphenylnitrosamine of high purity. The yield was 85%, based on the amine charged. The methylaniline-nitrogen trioxide reaction was in liquid phase.

EXAMPLE 7

A 500 ml. stainless steel autoclave was charged with 52 g. of distearylamine and 106 g. of diethyl ether. Eight grams of liquid nitrogen trioxide was added over a period of five hours, and reacted in diethyl ether solution. The temperature was maintained at 10° C. at a maximum pressure of about 60 p.s.i. The product, 51 grams, was a white solid. White shiny crystals were obtained upon recrystallization from alcohol, M.P. 67° C. The amine-nitrogen trioxide reaction was in liquid phase.

Analyses of the product for distearylnitrosamine gave the following results:

| Analysis | Found | Calculated for Distearyl-nitrosamine |
|---|---|---|
| Percent N | 4.91 | 5.08 |
| Percent C | 78.55 | 78.47 |
| Percent H | 13.42 | 13.51 |

Conversion to distearylnitrosamine was 93 percent, based on the amine charged. The yield was 95 percent.

Although the nitrogen trioxide reactant is highly soluble in diethyl ether, the distearylamine is only partially soluble in that solvent. It is a feature of this invention that high molecular weight amines, difficultly soluble in ordinary solvents, can be nitrosated employing such solvents. Thus, poly-secondary amines can be nitrosated in accordance with this invention even though difficultly soluble in the solvent employed.

Our invention provides for preparation of fatty acid nitrosamines which heretofore we have been unable to prepare by any other method. The foregoing example, showing preparation of distearylnitrosamine, is illustrative of this feature of our invention.

EXAMPLE 8

A 500 ml. stainless steel autoclave was charged with 28.5 grams of nitrogen trioxide and maintained in liquid phase at 65° C. at a maximum pressure of about 365 p.s.i. Forty-two grams of piperidine were added over a 55-minute period. The reaction mixture was held at about 65° C. for an additional 130 minutes. The reaction was maintained in liquid phase. The conversion of piperidine to N-nitrosopiperidine, recovered, was 90.5 percent.

EXAMPLE 9

100 grams of morpholine was charged to a 500 cc. autoclave and maintained therein at about 0° C. A solution of 54.5 grams of nitrogen trioxide in 100 grams of diethyl ether was pumped into the autoclave over a 120 minute period. The reaction was continued for an additional 300 minutes, being in liquid phase throughout. The final pressure was 280 p.s.i. N-nitrosomorpholine product was recovered at an amine conversion of 89.5 percent.

EXAMPLE 10

9.9 grams of nitrogen trioxide was charged to a 500 cc. autoclave and maintained therein in liquid phase. 170 grams of dirosin amine dissolved in 300 grams methylene chloride was then pumped into the autoclave over a two-hour period. The reactants were maintained at 140 p.s.i. and 45° C., and the reaction was in liquid phase. N-nitrosodirosin amine was recovered at an amine conversion of 92%.

Examples 1–4 and 6–10 illustrate the nitrosation of this invention together with various modus operandi, in accordance with which unpredicated high yields of nitrosamine are obtained. Thus, (1) the amine is introduced into a body of liquid nitrogen trioxide (Examples 1, 3, 6 and 8); (2) the nitrogen trioxide reactant is dissolved in a solvent, toluene and diethyl ether in the specific instances, and then introduced as a solution into a body of the amine (Examples 4 and 9); (3) the amine is introduced into a body of nitrogen trioxide dissolved in a nitrosamine as a solvent therefor (Example 2): (4) a solution of the amine, in this case in methylene chloride, is introduced into a body of liquid nitrogen trioxide (Example 10); and, (5) the amine is dissolved in a solvent which is also a good solvent for nitrogen trioxide, e.g., diethyl ether, followed by addition of liquid nitrogen trioxide into the amine solution whereby to effect nitrosation in solution (Example 7).

As illustrated with reference to Example 5, liquid nitrogen trioxide was pumped into an autoclave containing liquid diethylamine. Immediately upon entry into the autoclave the nitrogen trioxide vaporized and reacted in vapor phase with amine vapors in low and inefficient yield with undesired side reactions. Example 5, in light of other examples herein, illustrates relatively low yields of product obtained when nitrogen trioxide is reacted in vapor phase.

Temperatures employed in the practice of the nitrosation process of this invention are generally those in the range of from about −20° C. to about 250° C., although temperatures outside that range can be employed if desired; pressures employed are those within the range of from about 0.5 to about 700 atmospheres, although pressures outside that range can be employed if desired.

The pressures employed will depend upon the vapor pressure of the amine and the nitrogen trioxide reactants, and when a solvent is employed as described hereinafter, the vapor pressure of the solvent. The minimum pressure employed is that necessary to maintain the nitrogen trioxide reactant in liquid state or, in solution, if a solvent is employed. A pressure in the range of from about atmospheric to 1000 p.s.i.g. or higher, if desired, is preferably utilized. Pressure values in the upper portion of the preferred range, above described, are set largely by practical considerations.

In many instances the amine-nitrogen trioxide reaction is advantageously carried out at the vapor pressure of liquid nitrogen trioxide-containing reaction mixture and at a temperature in the range of about 0 to 15° C.

We prefer to employ temperatures in the lower portions of the above described −20 to 200° C. range when reacting amines containing functional groups that may otherwise be reactive with nitrogen trioxide, such temperatures often being in the range of from −20° C. to 50° C., and to employ somewhat higher temperatures when reacting more stable amines, preferably in the range of about 0 to 100° C.

We have discovered that unless the nitrogen trioxide reactant is maintained in liquid phase during the nitrosation, undesirable side reactions take place with concomitant low yields of nitrosamine product, as illustrated with reference to the examples herein, thus see Example 5.

We prefer to maintain the nitrogen trioxide reactant in liquid phase by either condensing it and maintaining it as a liquid in the reaction zone either at atmospheric pressure or superatmospheric pressure, or by maintaining it in solution in a suitable solvent such as diethyl ether, chloroform, methanol, carbon tetrachloride, n-hexane, octane, cyclohexane, benzene, toluene, a nitrosamine, or any suitable solvent chemically inert to the materials in the nitrosation zone, preferably by adding it to the nitrosation zone in solution.

Water can also be so employed although we have obtained lower yields of nitrosamine under such conditions. When employing the solvent as a vehicle for the nitrogen trioxide reactant, we prefer to employ from about 1 to 10 liquid volumes of solvent per liquid volume of nitrogen trioxide. When employing a solvent as an overall reaction mixture solvent from about 0.5 to 5 liquid volumes per liquid volume of total reactants is preferably employed.

Although it is within the scope of this invention to effect nitrosation of any secondary amine, amine reactants preferably employed in accordance with this invention are those of the class characterized by the following structural formula:

wherein each R is of the group of alkyl, aryl, aralkyl, alkaryl, halogen-substituted alkyl, and alkoxy radicals, and radicals which together with the nitrogen form a heterocyclic ring, and wherein not more than one R is an amine-substituted alkyl radical, each R containing not more than about 30 carbon atoms. Of the heterocyclic amine reactants of the preferred class above defined we prefer those in which the heterocyclic ring is saturated and contains from 5–7 atoms selected from the group consisting of carbon, nitrogen, sulfur and oxygen, at least one of the said atoms of which is N and at least three of which are carbon.

Exemplary of amine reactants of the process of this invention are dimethylamine, diethylamine, dipropylamine, dibutylamine, diamylamine, N-methyl-ethylamine, N-methyl-isopropylamine, N-ethyl-tert-butylamine, N-methyl-n-hexylamine, dioctylamine, N-ethyldecylamine, 2-methoxy-1-N-methylamino-ethane, N-methylcyclohexylamine, N-propyl-cyclohexylamine, N-cyclohexylheptylamine, dicyclohexylamine, N-methyl-abietylamine, N-methyl-dehydroabietylamine, N-methyl-hydroabietylamine, didehydroabietylamine, distearylamine, diabietylamine, dirosin amine, N-methylaniline, N-ethylaniline, N-tert-butylaniline, N-methyl-p-toluidine, N-methyl-1-naphthylamine, diphenylamine, N-methyl-benzylamine, N-phenyl-benzylamine, N-methyl-phenethylamine, N-methyl-furfurylamine, N-methyl-2-furanamine, piperidine, pyrrole, pyrroline, pyrrolidine, indole, carbazole, oxazine, morpholine, 2-N-methylamino-pyridine, N,N'-dimethylethylenediamine, N,N'-dimethyl-o-phenylenediamine, N,N'-diethyl-p-phenylenediamine and piperazine.

Although in the practice of this invention nitrogen trioxide from any suitable source can be employed as a nitrosating agent such as that prepared by mixing equal molar amounts of nitric oxide and nitrogen dioxide, we prefer to prepare the nitrosation agent by contacting at least one of the group of nitric oxide, nitrogen dioxide, nitrogen trioxide, nitrogen tetroxide, nitrogen pentoxide, and nitrous acid, with nitric acid and condensing resulting gas product, the resulting condensate serving as the nitrosating agent, as disclosed and claimed in the copending application, Serial No. 599,174 above referred to, now Patent No. 2,935,480.

Thus, with reference to FIG. 1 are graphically shown results of a number of runs made in the preparation of nitrogen trioxide-rich nitrosation agent by contacting nitrogen oxides with nitric acid under conditions of temperature, pressure and acid concentration correlated therefor. In these runs a mixture of nitrogen dioxide and nitrogen tetroxide as the feed gas stream was sparged through aqueous nitric acid at one atmosphere under conditions of temperature and acid concentration set forth to form gas product of average state of oxidation of fixed nitrogen suitable in condensed form as a nitrosating agent in the practice of this invention.

These curves illustrate the effect on the average state of oxidation of the fixed nitrogen, of change in temperature and change of acid concentration. Thus, a nitrogen oxide-containing gas of oxidation state 3 can be prepared from any nitrogen oxide gas mixture at 60° C. with aqueous nitric acid containing about 44 weight percent at one atmosphere. By decreasing the temperature to 50° C., the oxidation state has been lowered to 2.83; by changing the acid concentration to 50 percent, the oxidation state of the gas product is 3.25. Oxidation state of the gas product increases with increased temperature, increased pressure and with increased acid concentration.

FIG. 1 illustrates many additional sets of correlated conditions for producing gas product of the desired oxidation state for use in condensed form as a nitrosating agent in the practice of this invention.

Table 1 shows additional exemplary correlated conditions under which a nitrogen oxide and/or nitrogen oxide mixture were contacted at atmospheric pressure with nitric acid to form gas product suitable in condensed form as a nitrosating agent. The average oxidation state of the fixed nitrogen was within the range of 2.4–3.2 preferred for use of same as a nitrosation agent, the average oxidation state of 3 being most advantageously employed.

*Table 1*

| Run No. | Feed Gas | Temp. | Acid Concentration | Average Oxidation State of Fixed Nitrogen in Gas Product |
|---|---|---|---|---|
| 1 | NO₂+N₂O₄ | 50 | 51.3 | 3.15 |
| 2 | NO₂+N₂O₄ | 60 | 42.8 | 3.00 |
| 3 | NO₂+N₂O₄ | 40 | 46.2 | 2.77 |
| 4 | NO₂+N₂O₄ | 60 | 47.6 | 3.03 |
| 5 | NO₂+N₂O₄ | 40 | 52.7 | 3.01 |
| 6 | NO | 50 | 47.4 | 3.01 |

The reactor employed in making the runs of Table 1, preferably referred to as a rectifier inasmuch as the process involves a rectification of the nitrogen oxide and/or nitrous acid to form gas product of predetermined oxidation state, was an upright chamber containing a gas sparger for effecting uniform distribution of the feed gas with the nitric acid. Gas effluent was analyzed to determine oxidation state of the fixed nitrogen therein.

Any one or more of a nitrogen oxide, described herein, and nitrous acid can be contacted with nitric acid under the correlated conditions to form the desired oxidation state product. The following tabulated data, Table 2, are exemplary of correlated conditions of superatmospheric pressure, temperature and acid concentration that can be employed in the rectification of any one or more of a nitrogen oxide, described herein, and/or nitrous acid to produce gas product suitable in condensed form as a nitrosating agent of this invention.

*Table 2* [1]

| Pressure, p.s.i.g. | Temp., °C. | Nitric Acid Conc., Wt. Percent | Average Oxidation State of Gas Product |
|---|---|---|---|
| 120 | 110 | 62.0 | 2.9 |
| 120 | 79 | 62.0 | 3.03 |
| 120 | 53 | 62.0 | 3.13 |
| 110 | 110 | 59.5 | 3.00 |
| 80 | 79 | 59.5 | 3.12 |
| 80 | 110 | 62.0 | 2.8 |
| 100 | 79 | 62.0 | 2.9 |
| 100 | 53 | 62.0 | 3.0 |
| 100 | 110 | 65.0 | 2.85 |
| 95 | 79 | 65.0 | 2.98 |
| 95 | 53 | 65.0 | 3.18 |
| 95 | 110 | 62.0 | 3.03 |
| 60 | 79 | 62.0 | 3.17 |
| 60 | | | |

[1] Any one or more of a nitrogen oxide and nitrous acid gases described herein can be charged as feed.

Condensed gas product of containing at least one of the nitrogen oxides and nitrous acid gas with nitric acid to form gas product of average oxidation state of about 2.4 to about 3.2, such as condensate of gas product of the above tabulated data, can be employed as a nitrosating agent in accordance with this invention, such as by the modus operandi of Examples 1–10 herein. Any suitable correlation of conditions to produce gas product of predetermined oxidation state as above described can be made by one skilled in the art in light of the disclosure herein and in consideration of the well-known nitrogen oxide equilibrium of the following equations:

1. $3NO_2 + H_2O = 2HNO_3 + NO$
2. $2NO_2 = N_2O_4$
3. $NO + NO_2 = N_2O_3$
4. $HNO_3 + N_2O_4 = HNO_2 + N_2O_5$
5. $NO + NO_2 + H_2O = 2HNO_2$
6. $HNO_3 = H^+ + NO_3^-$

The equilibrium characteristics of the foregoing reactions are well known and they depend upon the specific temperature, pressure and nitric acid concentration employed. Accordingly, at a given temperature, pressure and acid concentration, the amount of any of the above species of oxide is fixed. If one of the species is added to the rectification system, the equilibrium is temporarily upset but it rapidly returns to its initial value, all other conditions remaining constant. Thus, by varying any one or more of the conditions of temperature, pressure and acid concentration of the rectification system, the ratio of nitrogen oxides in the gas phase above the nitric acid can be varied over a range suitable for producing a preferred form of our nitrosating agent. We thus utilize the known equilibria of the foregoing equation in effecting the desired correlation of conditions described above.

Although we contemplate suitable correlation of any suitable temperature, pressure and acid concentration conditions, we in the rectification described, prefer to correlate conditions selected from a temperature range of about 25 to 100° C., a pressure range of about 0.5 to 15 atmospheres and an acid concentration range of about 30 to 70 weight percent.

The nitrosation process of our invention can be carried out batchwise or on a continuous basis as desired. Thus, any suitable reaction chamber with conventional pumping and temperature regulation means for control of the reaction including facilities for feeding and for recovery and recycle of unreacted reactants can be utilized. The nitrosation product can be recovered and purified in the case of liquids by distillation or, in the case of solids, by recrystallization.

It is especially advantageous that the nitrosation reaction mixture be agitated at all times in order to prevent localization of nitrogen trioxide with concomitant decomposition resulting in presence of undesirable by-products in the nitrosation product and in concomitantly lowered product yield.

We have found that when we have certain proportions of water, nitrogen trioxide and nitrosamine product in the nitrosation reaction mixture, the said mixture may be detonatable. Therefore, we prefer to regulate the proportions of reaction mixture components so as to maintain them outside potentially dangerous ranges. Whether or not a specific reaction mixture of our process is detonatable will depend not only on the particular reactant and product involved, but also the proportions of such components in the reaction mixture.

Figure 2:
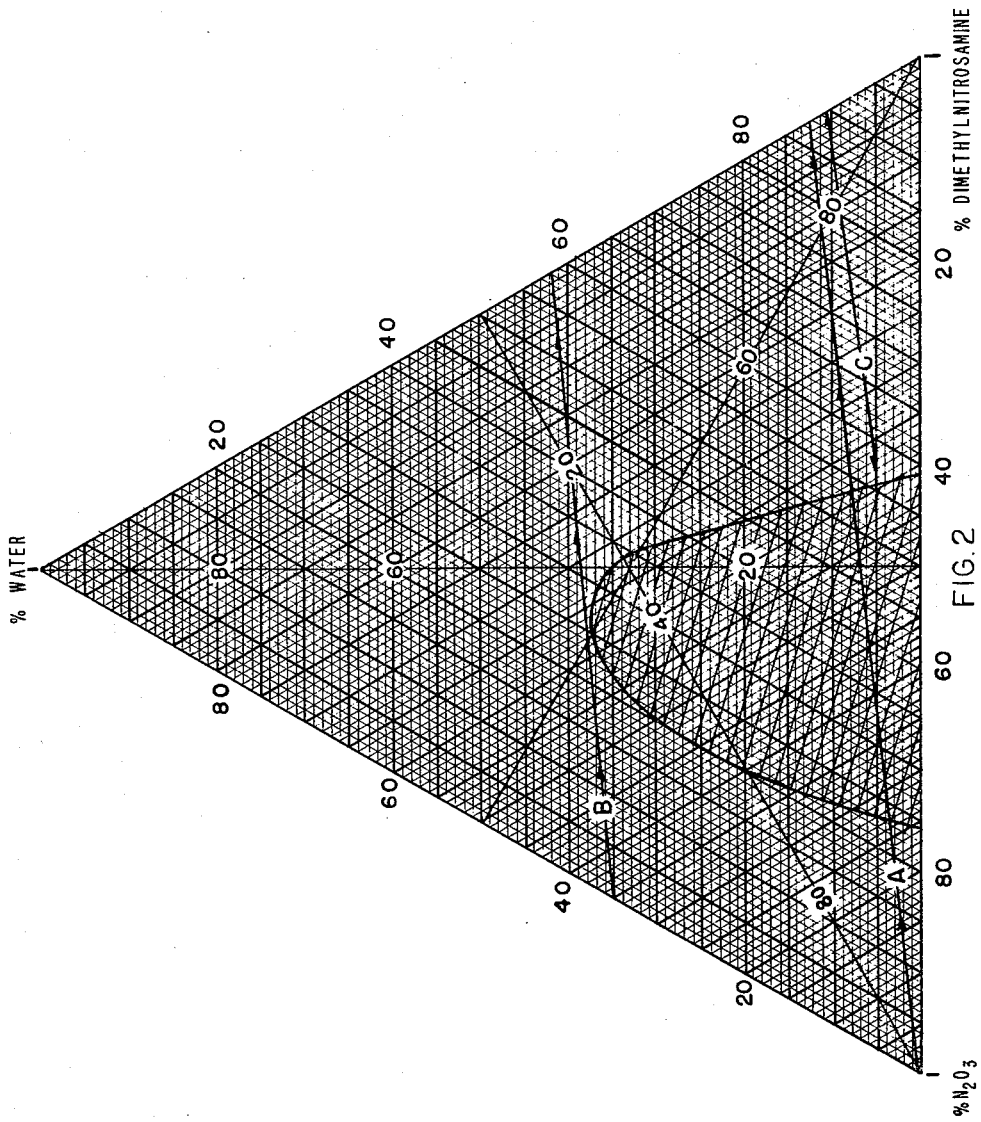

FIG. 2, with specific reference to nitrosation of dimethylamine, graphically illustrates conditions under which a reaction mixture of a secondary amine and nitrogen trioxide to form a nitrosamine, may be detonatable. Thus, with reference to the ternary graph of FIG. 2, which is a plot of concentration of water, nitrogen trioxide and dimethylnitrosamine in a reaction mixture of dimethylamine and nitrogen trioxide to form dimethylnitrosamine, the cross-hatched area is the detonatable region, i.e., it can be detonated by a No. 8 commercial blasting cap. The line "A" shows the change in composition within the reaction zone when dimethylamine is added to nitrogen trioxide according to the reaction equated as follows:

$$2(CH_3)_2NH + N_2O_3 \rightarrow 2(CH_3)_2NNO + H_2O$$

As is clear from the graph of FIG. 2, the reaction mixture containing component proportions consonant with the foregoing equation is explosive during much of the reaction time.

We avoid the explosive region by working in the region "C" of FIG. 2, that is we employ dimethylnitrosamine as a solvent. We have found that if as much as 60 weight percent dimethylnitrosamine is present in the reaction mixture, the explosive area in this system is avoided. Accordingly, when initiating reaction, we prefer to have present in the reaction zone at least 60 percent dimethylnitrosamine. Ordinarily for such purpose we employ as a starting mixture a crude reaction product of dimethylamine and nitrogen trioxide from a prior reaction. The crude product will be the unseparated mixture of dimethylnitrosamine and water which contains 12.4 weight percent water and 87.6 weight percent dimethylnitrosamine. To this is then added 40 percent nitrogen trioxide to form a homogeneous mixture, followed by addition of the amine reactant to obtain a rapid and substantially quantitative yield outside the detonatable range of FIG. 2.

Figure 3:
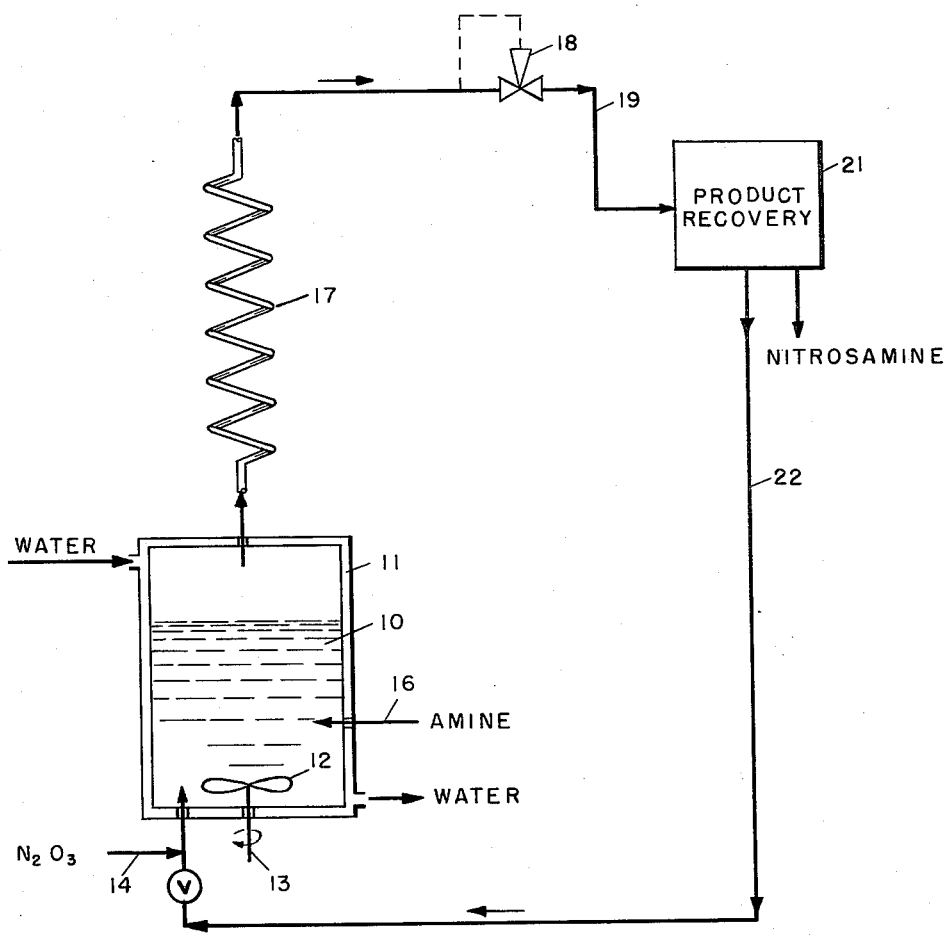

With reference to FIG. 3 is illustrated one embodiment of continuous flow-type operation of our process, in accordance with which nitrosation is conducted outside the explosive area of FIG. 2.

Reactor 10, equipped with water jacket 11 and propeller stirrer 12 driven by shaft 13 through the bottom of reactor 10, is adapted to stand a pressure of at least 500 p.s.i. Reactor 10 is substantially filled with a crude nitrosation product of the kind above described, e.g., dimethylnitrosamine reaction product, or with a nitrosamine of higher purity, as desired, via any suitable line, say line 14. The crude reaction product is preferred. Cooling water is circulated through jacket 11 at an initial temperature in the order of about room temperature. Obviously, higher or lower cooling water inlet temperatures can be employed dependent on the reactant flow rates, reaction temperature contemplated, specific reactants employed and the like. It is generally desired to circulate cooling water to control the temperature of the amine nitrosation, exothermic in nature, at less than about 70° C. Liquid nitrogen trioxide is continuously introduced into reaction chamber 10 at a point below propeller 12 via line 14, and the amine is continuously introduced into reaction chamber 10 at a point in close proximity to propeller 12 and above it via line 16. Nitrogen trioxide is generally introduced into chamber 10 in stoichiometric excess of the amine in order that the amine will always be completely reacted and nitrogen trioxide can be easily separated from the product and recycled to chamber 10. However, the amine can be introduced into chamber 10 in stoichiometric excess of the nitrogen trioxide and recycled, as desired.

Reaction in chamber 10 begins immediately and with a rise in reaction temperature, controlled however by cooling water circulation. However, any suitable temperature control means can be utilized. As the reactor 10 becomes overfull, the excess flows out of the reactor via finishing coil 17 of sufficient length and cross section to permit residual amine and $N_2O_3$ reactants to react. In order to insure complete reaction in coil 17, it may be advantageous to apply heat to it to bring its temperature up to as high as say 100° C. or somewhat higher, as may be required.

Pressure is maintained in chamber 10 by back-pressure valve 18 and effluents are then passed via line 19 to product recovery 21 comprising any suitable product recovery means of the art for separating excess reactant, generally nitrogen trioxide, for recycle to chamber 10 via line 22 and for separation of nitrosamine product and recovery of same via line 23.

It is to be understood that, if desired, quantitative proportions of amine and nitrogen trioxide can be introduced into chamber 10 to provide quantitative reaction with substantially no nitrogen trioxide or amine in the coil 17 effluent.

By altering the rate of cooling water through jacket 11, correspondingly altered feed rates of amine and nitrogen trioxide can be employed to provide for a corresponding change in reactor capacity without substantially affecting the quantitative nature of the reaction, i.e., without affecting conversion or yield.

Further exemplary of a specific operation of the continuous flow embodiment of FIG. 3 is introduction of the amine in a mole ratio to $N_2O_3$ of say about 2:1 with a pumping rate of nitrogen trioxide of about 2 kg./hr. into a 2 liter stainless steel autoclave adapted to operate at a minimum of 500 p.s.i., a finishing coil of say 30 feet of ⅜ inch #80 stainless steel and a back-pressure valve 18 set to relieve at 300 p.s.i., and continuous agitation by operation of propeller 12.

The foregoing embodiment of continuous flow-type operation is further illustrative of the use of nitrosamine product as a solvent in our nitrosation process to maintain the reaction mixture component proportions outside the region in which the reaction mixture may otherwise be detonatable, such a region being illustrated in FIG. 2.

Although, if desired, one might add an inert material to the nitrosation mixture to avoid the explosive area, if one exists in the specific instance, such practice will generally create problems of separation and recovery of the said inert material and associated handling difficulties. If a solvent is employed for that purpose, there is always the possibility of side reactions with the solvent.

Further, as apparent from FIG. 2, one can add sufficient water to the reaction mixture to avoid such an explosive region as indicated by line "B" of FIG. 2. However, we have found that when initiating reaction with as much as 35 percent water in the nitrogen trioxide, the yield of nitrosamine is reduced considerably. Also, by-products formed, amine nitrates and nitrites are somewhat explosive in themselves. Further, additional water in the product complicates purification of the nitrosamine formed.

It is to be understood that it is within the scope of our invention to maintain any desired concentration of nitrosamine in the nitrosation reaction mixture whether that specific mixture is otherwise detonatable or not, inasmuch as the nitrosamine, either product or other secondary nitrosamine, in all events is a preferred nitrosation solvent. We prefer to maintain at least 60 weight percent nitrosamine in the reaction mixture as a precautionary measure when the detonation characteristics of the specific reaction mixture are unknown.

We have found that the detonating area illustrated with reference to FIG. 2 is smaller when secondary amines of molecular weight greater than that of dimethylamine are reacted. Thus, in those instances, an amount of nitrosamine below 60 weight percent can be employed in maintaining the nitrosation reaction outside the detonating area. Similarly, although a concentration of not more than about 40 weight percent nitrogen trioxide in the reaction mixture is to be employed in maintaining the dimethylamine nitrosation of FIG. 2 outside the detonating area, correspondingly larger concentrations can be utilized for maintaining the reaction outside the detonating area when nitrosating secondary amines of molecular weight higher than that of dimethylamine.

It is of course understood that the concentration of water or inert solvent in the nitrosation reaction mixture can be regulated, as described hereinabove, to maintain the reaction outside the detonating area. The concentration of water and/or solvent to be employed therefor will be apparent to one skilled in the art, in light of the disclosure, lower concentrations of either or both water or solvent being required when reacting secondary amines of molecular weight greater than that of dimethylamine.

Nitrosamines produced in accordance with this invention can be used as gasoline and lubricant additives, antioxidants and stabilizers, rubber additives, fungicides and bactericides. Also various nitrosamines prepared by rearrangement of corresponding nitrosamines can be used as antioxidants in gasoline and hydrocarbon plastics and as nematocides and fungicides as, for example, p-nitroso-N-methylaniline, p-nitroso-diphenylamine and p-nitroso-N-dimethylaniline. N-nitrosodiphenylamine, another such rearrangement product, can be used as a gasoline antiknock agent.

As will be evident to those skilled in the art, various modifications can be made or followed in light of the foregoing disclosure and discussion without departing from the spirit or scope of the disclosure or from the scope of the claims.

What we claim and desire to protect by Letters Patent is:

1. In a process for the reaction of a secondary amine with nitrogen trioxide to form a nitrosamine, the improvement comprising conducting said reaction in liquid phase at a temperature within the range of from −20 to 250° C. to thereby form said nitrosamine in yields higher than obtained when effecting said reaction in vapor phase, and resulting reaction mixture being capable of detonation under the said liquid and temperature conditions; regulating the concentration of nitrogen trioxide in the said reaction mixture to a sufficiently low value to maintain the reactant proportions of said reaction mixture outside the area of those which are detonatable under the above said conditions; the said secondary amine being characterized by the structural formula:

wherein each R is selected from the group consisting of alkyl, aryl, aralkyl, alkaryl, haloalkyl, alkoxy, and radicals which together with the N form a heterocyclic compound selected from the group consisting of piperidine, pyrrolidine, morpholine, and piperazine, each R containing not more than about 30 carbon atoms, and recovering nitrosamine product so produced.

2. A process of claim 1 wherein prior to addition of said nitrogen trioxide to the zone of said reaction, a nitrosamine, the same as the said nitrosation product, is added to the said zone in an amount sufficient to maintain the said concentration value of nitrogen trioxide when initially added to said zone; thereafter continuously adding liquid nitrogen trioxide and liquid secondary amine to the said zone and continuously withdrawing total effluent therefrom; separating nitrosamine from the said effluent, and then recycling a portion of same to said zone in an amount sufficient to continuously maintain the said concentration of nitrogen trioxide therein.

3. A process of claim 1 wherein a sufficient amount of an organic solvent for said reaction mixture and chemically inert to the ingredients thereof is maintained in said reaction mixture as a diluent to maintain the said nitrogen trioxide concentration.

4. In a process for the reaction of a secondary amine with nitrogen trioxide to form a nitrosamine, the improvement comprising reacting dimethylamine as said secondary amine and conducting the said reaction in liquid phase at a temperature of from −20 to 250° C.; and regulating the concentration of nitrogen trioxide in the resulting reaction mixture at a values not exceeding 40 weight percent to thereby maintain the reactant proportions of said reaction mixture outside the area of those which are detonatable under the above said liquid phase and temperature conditions; and recovering dimethylnitrosamine product so produced.

5. In a process for the reaction of a secondary amine with nitrogen trioxide to form a nitrosamine, the improvement comprising reacting dimethylamine as said secondary amine and conducting the said reaction in liquid phase at a temperature of from −20 to 250° C.; maintaining dimethylnitrosamine in a concentration of at least 60 weight percent in the resulting reaction mixture to thereby keep the concentration of nitrogen trioxide therein sufficiently low that the reactant proportions of said reaction mixture are outside the area of those which are detonatable under the above said liquid phase and temperature conditions; and recovering dimethylnitrosamine as product of the process.

6. A process of claim 4 wherein prior to addition of said nitrogen trioxide to the zone of said reaction, dimethylnitrosamine is added to the said zone in an amount sufficent to provide at least 60 weight percent of the resulting reaction mixture when said nitrogen trioxide is initially added to said zone; thereafter continuously adding liquid nitrogen trioxide and liquid dimethylamine to the said zone and continuously withdrawing total effluent therefrom; separating dimethylnitrosamine from the said effluent, and then recycling a portion of same to said zone in an amount sufficient to continuously maintain the said 60 percent concentration.

References Cited in the file of this patent

FOREIGN PATENTS 541,485     Italy _____ Apr. 3, 1956

OTHER REFERENCES

Schwarz et al.: Deutsche Chemische Gesellschaft (Berichte), volume 67, pages 1110 and 1111 (1934).

Schmid: "Monatshefte Fur Chemi," volume 85, pages 424–440, 1954.

UNITED STATES PATENT OFFICE
CERTIFICATE OF CORRECTION

Patent No. 3,062,887                          November 6, 1962

Dewey Robert Levering et al.

It is hereby certified that error appears in the above numbered patent requiring correction and that the said Letters Patent should read as corrected below.

Column 4, line 24, for "diethylamine" read -- dimethylamine --; line 63, for "maintaned" read -- maintained --; column 6, line 75, for "containing" read -- contacting --; column 10, line 69, for "values" read -- value --.

Signed and sealed this 23rd day of April 1963.

(SEAL)
Attest:

ERNEST W. SWIDER
Attesting Officer

DAVID L. LADD
Commissioner of Patents